United States Patent Office 3,537,986
Patented Nov. 3, 1970

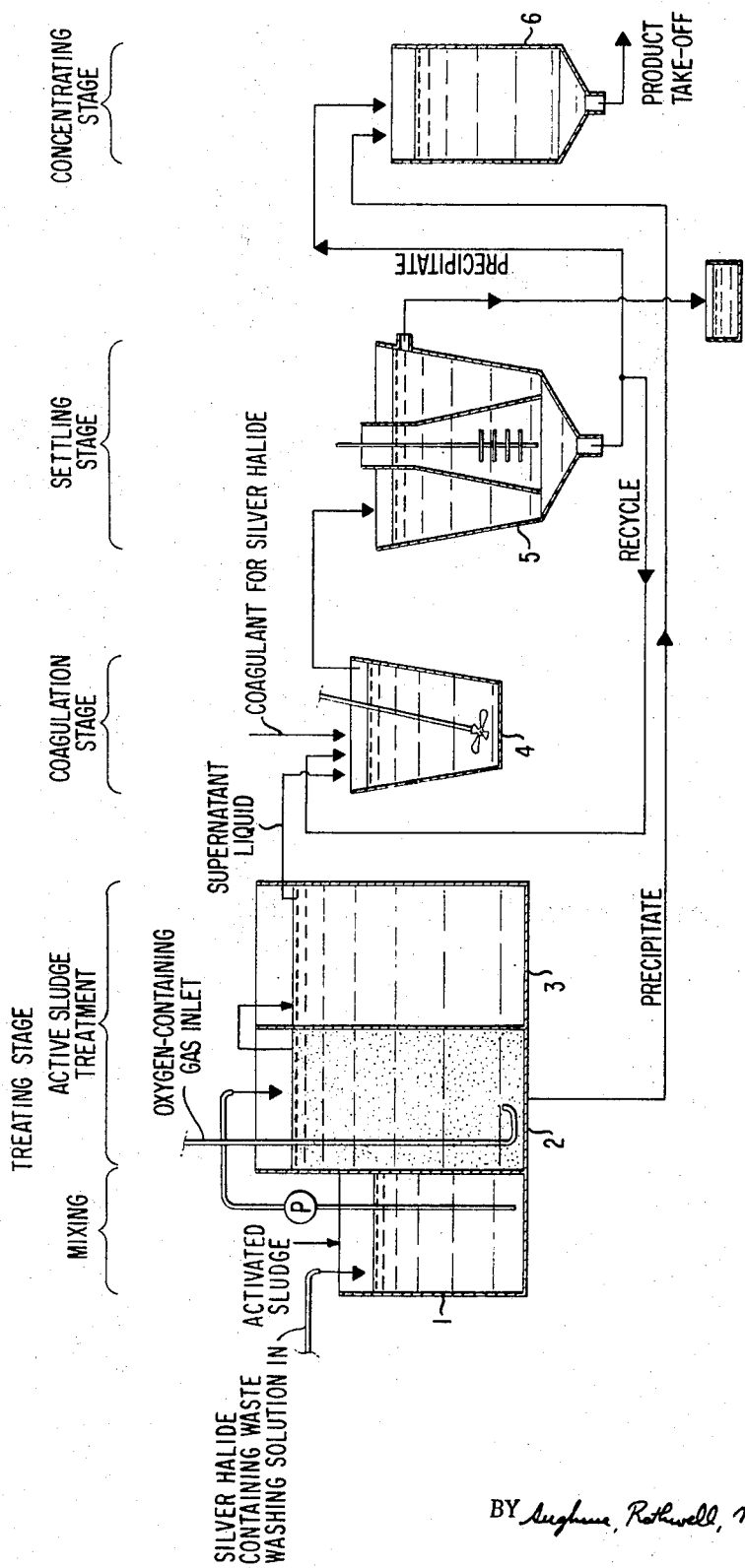

3,537,986
SILVER RECOVERY PROCESS
Kazuaki Watanabe, Tokyo, and Hideo Ono and Kinji Ushiyama and Noboru Shinkai, Kanagawa, Japan, assignors to Sumitomo Kikai Kogyo Kabushiki Kaisha, Tokyo, Japan, and Fuji Shashin Film Kabushiki Kaisha, Kanagawa, Japan
Filed Oct. 19, 1967, Ser. No. 676,535
Int. Cl. B01d 59/36, 15/06, 21/01
U.S. Cl. 210—15       12 Claims

ABSTRACT OF THE DISCLOSURE

A process for recovering silver values from waste solutions which contain silver halide and gelatin which comprises treating the silver halide-gelatin containing waste solution with active sludge, whereby organic materials, primarily gelatin, are aerobically oxidized and decomposed, silver halide is adsorbed on the sludges and precipitated with the formation of a supernatant liquid which contains any unprecipitated silver, and recovering the silver halide adsorbed on the active sludge and in the supernatant liquid.

BACKGROUND OF THE INVENTION

Field of the invention

The present invention relates to a process for recovering silver values from a waste washing solution or from the washing water produced during the course of manufacturing photographic light-sensitive materials.

Description of the prior art

In the photographic industry, so much valuable silver is consumed that it is necessary to recover silver not only from waste articles of photographic light-sensitive materials, but also from waste solutions produced in developing processes and in the manufacture of photographic light-sensitive materials.

It is particularly important to recover the silver (silver halide) contained in waste washing solutions by-produced in the manufacture of photographic light-sensitive materials. Although the silver content in each waste washing solution is only several parts per million (hereafter p.p.m.), the volume of waste washing water produced is very large.

It is very difficult to completely recover silver or silver halide from a waste washing solution because the silver halide content of waste washing solutions is very small, and a protective colloid, such as gelatin, is generally coexistent with the silver halide.

No satisfactory method for recovering silver or silver halides from waste washing solutions has been known in the prior art.

Silver halide has heretofore been recovered from waste washing solutions by various methods. For example, a centrifugal separation method, wherein the silver halide is precipitated and separated by means of a centrifugal separator, has been utilized.

A coagulan method, wherein silver halide is coagulated by the addition of a coagulant, and then precipitated, has also been used.

An electrolytic method wherein the silver halide is deposited by using an aluminum anode has also been attempted.

However, the centrifugal method is not effective, since the recovery yield of silver halide is generally low, in the area of 70–80%. The coagulant method and the electrolytic method are also unprofitable from an economic viewpoint, because the former requires a larger quantity of a coagulant, and the latter is invariably accompanied by a low aluminum anode efficiency. Furthermore, with the coagulant method, a large amount of coagulant is intermingled with gelatin and the like in the precipitate. This markedly reduces the percentage content of silver halide recovered in the precipitate, and makes the subsequent recovery of silver from the precipitate difficult.

SUMMARY OF THE INVENTION

Therefore, an object of this invention is to provide a new silver recovery process in which the aforesaid difficulties are overcome.

This invention provides a process for recovering silver values from the waste washings resulting from washing steps in the manufacture of photographic light-sensitive materials while using reduced amounts of coagulant.

The inventors have found that silver halide which is contained in waste washings in a very small concentration, together with gelatin formed during washing procedures of manufacturing photographic light-sensitive materials, can be recovered easily and with good recovery yields. This is accomplished by utilizing an active sludge process during the silver recovery. The Condensed Chemical Dictionary, sixth edition, Reinhold Publishing Company, page 1014, defines activated sludge as follows:

"An organic material obtained by purifying city sewage. Obtained in two varieties:

(a) Imhoff sludge: A low-grade sludge containing from 2 to 3% ammonia and about 1% phosphoric acid.

(b) Activated sludge: A high-grade sludge containing from 5.0 to 7.5% ammonia and from 2.5 to 4.0% phosphoric acid.

Derivation: (a) By running sewage through settling tanks without the access of air. The sludge, or solid matter, is settled by the aid of anaerobic bacteria. (b) By running sewage through settling tanks and forcing air in through porous plates at the bottom of the tanks. 20% of the current "make" is also added. The action of the bacteria causes the solid organic matter to coagulate and settle. It is subsequently filtered and dried."

During the course of investigations into the recovery of silver from the waste washings produced in the manufacture of photographic light-sensitive materials, it was discovered that by applying an active sludge process the amount of coagulant needed was reduced to $\frac{1}{10}$ to $\frac{1}{15}$ of that required in conventional processes.

BRIEF DESCRIPTION OF THE DRAWING

The figure illustrates a preferred embodiment of the process.

DESCRIPTION OF THE PREFERRED EMBODIMENT

According to an embodiment of the process of this invention, a waste washing solution containing a very slight amount of silver halide and gelatin from washing steps in the manufacture of photographic light-sensitive materials is agitated. This may be done by introducing the waste solution into a mixing chamber. Preferably, this mixing is a homogenization. The solution is then introduced into a chamber containing an active sludge. Preferably, the washing solution is stored in this chamber for about 3 to 5 hours.

It is necessary that sufficient oxygen be present during storage. Preferably, this oxygen is supplied by introducing air into the chamber so that the oxygen content becomes greater than 2 p.p.m. The air, or other free oxygen containing gas, may also be utilized to agitate the system, though other conventional methods are acceptable. By this procedure, 70–80% of the silver halide in the waste washing solution can be precipitated by the oxidation and decomposition of organic materials caused by the propagation of aerobic bacteria and by the adsorbing action of the active sludge.

Generally, a supernatant liquid, which contains some silver halide, is formed during the initial precipitation.

After initial precipitation, a coagulant, such as aluminum sulfate or ferric chloride, is added into the supernatant liquid of the system to precipitate any silver halide contained in the supernatant liquid. Thus, the silver halide in the washing solution is completely recovered, and since a coagulant is only utilized to precipitate the silver halide contained in the supernatant liquid, the amount of coagulant required is much smaller than that required in conventional methods.

The remarkable reduction in the amount of coagulant required contributes to reducing the operating cost of the process. Moreover, by using the process of this invention, the impurity content of the recovered product is decreased, which increases the proportional amount of silver halide present. Subsequent refining procedures for the recovery of silver halide can thus be more easily practiced.

The invention will now be explained with reference to the accompanying drawing.

In the drawing, a waste solution from a washing step in the manufacture of photographic light-sensitive materials is supplied to a treating stage. This is initially mixing chamber 1, in which the solution is stirred, preferably by the introduction of air. Air supplies sufficient amounts of oxygen to homogenize the system, and is preferably utilized, although other oxygen containing gases will suffice. Retention time is influenced by the concentration of silver halide and organic matter in the waste solution, but usually 2–5 hours is sufficient for adequate homogenization. The homogenized waste solution is then pumped into chamber 2 which is filled with active sludges which have previously been cultured. Air is introduced into the solution in chamber 2 in order to supply the oxygen necessary for the propagation of aerobic bacteria and to stir the system. During this step, a small amount of ammonia and a phosphate may be supplied to the system in order to promote the propagation of aerobic bacteria and to prolong the functioning of the active sludges. By storing the waste solution in chamber 2 in this condition for about 2–5 hours, about 80% of the organic material, comprising mainly gelatin, is decomposed, and about 70–80% of the silver halide can be adsorbed on the active sludges. Supernatant liquid is formed in a precipitation chamber which is connected to chamber 2 in such a manner that the supernatant solution in the chamber 2 is transferred to the chamber 3 after the active sludge treatment. Any precipitate which is formed is transferred to a concentrating chamber 6 for further processing. The solution is then introduced into a high speed stirring chamber 4 (coagulation stage) where a coagulant is added. Typical coagulants useful in the instant process are Polyaluminum Chloride (trade name; made by Taki Fertilizer Manufacturing Co.), aluminum sulfate, ferric chloride and the like. Generally, the addition of 50 p.p.m. of coagulant is sufficient.

The solution, which now contains coagulant, is introduced into a forced settling chamber 5 (settling stage), wherein the system is separated into a precipitate layer and a supernatant liquid. The supernatant liquid is withdrawn, and the precipitate is introduced into a concentrating chamber 6, together with precipitate formed in the chamber 2. The precipitated sludges which are concentrated in chamber 6 (concentrating stage) are dried and sent to a conventional recovery process in order to separate the adsorbed silver halide from the sludges. The silver halide is further reduced into metallic silver, if necessary.

In general, the concentration of silver halide in a waste washing solution is greater than 10 p.p.m., and the gelatin concentration generally does not run above about twice as much as the concentration of the silver halide.

The amount of coagulant required can be remarkably reduced by applying the active sludge method of this invention. When using aluminum sulfate as the coagulant, 500–1,000 p.p.m. must be added to effectively precipitate the silver halide in a conventional process (without active sludge), whereas, silver halide can be recovered by using about 50 p.p.m. of coagulant in the process of this invention. If a large amount of coagulant is required, it may be necessary to use an alkali agent, such as soda, calcium hydroxide and the like.

By using this invention, the amount of silver halide adsorbed by the active sludges is about 70–80%, and the amount of coagulant used for precipitating silver halide which remains in the supernatant liquid may be very small. This facilitates the separation and recovery of silver from the precipitate.

The invention will further be illustrated by the following example.

EXAMPLE

When a waste washing solution from the manufacture of photographic light-sensitive films, containing 80 p.p.m. of silver bromide and 100–200 p.p.m. of gelatin was processed using the system of this invention without subjecting it to an active sludge treatment, 500–1,000 p.p.m. of aluminum sulfate was used. When the solution was subjected to an active sludge treatment to separate 70–80% of the silver halide by adsorbing it on the active sludges and the remaining silver halide in the supernatant liquid was precipitated by adding coagulant in accordance with this invention, the amount of coaqulant required was only 50 p.p.m.

In addition, since the amount of coagulant in the precipitates (which contain silver halide and the active sludges collected at the bottom of the concentration chamber) was very low, the proportional content of silver halide was high, and the refining of silver could be easily carried out.

While the invention has been particularly shown and described with reference to a preferred embodiment thereof, it will be understood by those skilled in the art that various changes in form and details may be made therein without departing from the spirit and scope of the invention.

What is claimed is:

1. A process for recovering silver halide from a waste solution containing silver halide and gelatin which comprises:

treating the waste solution with active sludge to aerobically oxidize and decompose the gelatin in the solution and adsorb the silver halide on the active sludge, allowing the sludge to precipitate with adsorbed silver thereon, thus leaving unprecipitated silver halide in a supernatant liquid formed during the treatment; and recovering the silver halide adsorbed on the active sludge and dissolved in the supernatant liquid.

2. A process as in claim 1 wherein the waste solution is agitated prior to the active sludge treatment.

3. A process as in claim 2 wherein the agitation is accomplished by the introduction of a gas containing free oxygen.

4. A process as in claim 3 wherein the agitation is conducted for about 2–5 hours.

5. A process as in claim 1 wherein the waste solution is maintained in intimate contact with the active sludge for about 3–5 hours.

6. A process as in claim 1 wherein the silver halide dissolved in the supernatant liquid is precipitated, following the active sludge treatment, by adding a coagulant to the supernatant liquid.

7. A process as in claim 6 wherein the precipitant formed by the addition of said coagulant is combined with the precipitant formed by said active sludge treatment.

8. A process as in claim 1 wherein the active sludge treatment is conducted in the presence of added oxygen.

9. A process as in claim 8 wherein the oxygen is provided by the introduction of air.

10. A process as in claim 9 wherein the air is introduced so that it agitates the system.

11. A process as in claim 10 wherein the final oxygen concentration of the active sludge treated mixture is above about 2 p.p.m.

12. A process as in claim 11 wherein the silver halide dissolved in the supernatant liquid is precipitated, following the active sludge treatment, by adding a coagulant to the supernatant liquid.

References Cited
UNITED STATES PATENTS 3,145,166  8/1964  Howe _____ 210—16

FOREIGN PATENTS 211,928  5/1956  Australia.
804,544  11/1958  Great Britain.

OTHER REFERENCES

Oxidation of Radioactive Glucose by Aerated Sludge, N. Porges Sewage and Industrial Wastes, vol. 30, No. 6, June 1958.

NORMAN YUDKOFF, Primary Examiner

ARTHUR F. PURCELL, Assistant Examiner

U.S. Cl. X.R.

23—87, 312